United States Patent
Bishop et al.

(10) Patent No.: US 6,197,252 B1
(45) Date of Patent: Mar. 6, 2001

(54) BINDER REMOVAL

(75) Inventors: Ian H. Bishop, Totnes; David Masheder, Newtonabbot, both of (GB)

(73) Assignee: AVX Limited, Paignton (GB)

( * ) Notice: Subject to any disclaimer, the term of this patent is extended or adjusted under 35 U.S.C. 154(b) by 0 days.

(21) Appl. No.: 09/351,637

(22) Filed: Jul. 12, 1999

Related U.S. Application Data

(63) Continuation of application No. PCT/GB98/00023, filed on Jan. 6, 1998.

(30) Foreign Application Priority Data

Jan. 13, 1997  (GB) .................................................. 9700566

(51) Int. Cl.$^7$ ...................................................... B22F 1/00
(52) U.S. Cl. ................................ 419/36; 419/37; 419/65; 264/344
(58) Field of Search .................................. 419/2, 36, 37, 419/65; 264/344

(56) References Cited

U.S. PATENT DOCUMENTS

| | | | |
|---|---|---|---|
| 4,278,727 | 7/1981 | Brabetz et al. . | |
| 4,283,360 | * 8/1981 | Henmi .................................... | 264/44 |
| 4,765,950 | * 8/1988 | Johnson .................................. | 419/2 |
| 5,043,121 | 8/1991 | Wingefeld et al. . | |
| 5,059,388 | * 10/1991 | Kihara et al. ......................... | 264/344 |
| 5,332,537 | * 7/1994 | Hens et al. ............................ | 419/36 |
| 5,470,525 | * 11/1995 | Tripp et al. ........................... | 419/36 |
| 5,665,289 | * 9/1997 | Chung et al. .......................... | 419/2 |
| 5,977,230 | * 11/1999 | Yang et al. ............................ | 419/36 |

FOREIGN PATENT DOCUMENTS

0688746A1   12/1995   (EP) .
4-97957     3/1992    (JP) .

* cited by examiner

*Primary Examiner*—James Derrington
(74) *Attorney, Agent, or Firm*—Dority & Manning

(57) ABSTRACT

The invention relates to a method of removing water-insoluble binder from a porous article formed from pressed particulate material, such as tantalum powder. The invention provides a method capable of removing substantially all of the binder from the article for high purity applications, such as capacitor manufacture. The method comprises contacting the article with an aqueous solution of an agent which reacts with said binder to produce a water soluble derivative thereof whereby said binder derivative may be substantially dissolved in said solution. In a particular embodiment, the derivative is produced by hydrolysis of a fatty acid binder.

1 Claim, No Drawings

BINDER REMOVAL

This is a continuation of international application Serial No. PCT/GB98/00023 filed Jan. 6, 1998, pending.

The present invention relates to the field of forming articles by pressing of particulate matter bound by a binder/lubricant, and more particularly to methods of manufacturing components of high purity sintered articles in which the binder is removed after pressing and before sintering.

In the manufacture of tantalum capacitors the anodes are typically formed by mixing tantalum powders with a small quantity of binder/lubricant, compacting and moulding the mixture to form the required shape and subsequently removing the binder by heating under vacuum so that the binder sublimes, distils or decomposes. After removal of the binder, the anodes are sintered to fuse the powder into an integral article.

The choice of binder/lubricant material (hereinafter "binder") in electrical or other high purity applications is limited by the requirement that little or no carbonaceous residues should be left after the vacuum heating process, and that no oxygen is added to the anode by the removal process. The presence of such residues alters the electrical properties of the capacitor by degrading the anodic oxide film deposited onto the sintered tantalum product. Binders currently used include camphor, certain waxes and certain polymers.

Even with these binders it is inevitable that a small amount of carbon will have been added to the anode because of incomplete removal of the binder or its decomposition products and residues. Furthermore small quantities of oxygen will also be present because of the heating cycle used for removal and because of oxygen present in the binder itself.

U.S. Pat. No. 5,470,525 discloses a method of removing binder from tantalum powder pellets by leaching in warm aqueous detergent solutions, followed by washing in clean water. However, in the method disclosed by the aforementioned specification, the leaching process takes a considerable amount of time, typically many hours.

It is an object of the present invention to provide a method of removing binder for high purity applications and which improves upon the known methods.

According to the present invention there is provided a method of removing water-insoluble binder from a porous article formed from pressed particulate material comprising contacting the article with an aqueous solution of an agent which reacts with said binder to produce a water-soluble derivative thereof whereby said binder derivative may be substantially dissolved in said solution.

Thus the present invention removes the binder by chemical reaction and dissolution of highly soluble reaction products. In this way the binder may be removed without the complicated distillation or high temperature heating processes of the prior art, and at a rate which is considerably faster than known heated leaching processes.

The contact may be effected by immersion of the article in a fluid containing or comprising the said agent. In this way fluid enters the article through pores present therein to contact with the binder.

In one aspect of the invention the contact is effected by immersing the article in an aqueous solution of the agent.

The aqueous solution may be heated to facilitate the removal of binder from the article. The temperature of the solution is preferably above the melting point of the binder whereby the binder liquifies when immersed in the solution.

The binder material may be a higher fatty acid. In this case the modification process may comprise hydrolysis of the acid in the presence of an alkaline solution. Thus the salt of the fatty acid is formed, which salt dissolves into solution to effect removal of the binder.

A preferred fatty acid is stearic acid. Fatty acids are cheap, readily available and very effective binder/lubricants. However, their use up to date for high purity applications has been restricted by the difficulty of completely removing the binder after pressing and by their high carbon content which makes residues particularly damaging for certain high purity applications.

In another aspect of the invention the binder may comprise a mixture of the water-insoluble binder material and a water-soluble material. Such a water soluble material may be a long chain alcohol such as a polyethylene glycol. A preferred combination is a fatty acid such as stearic acid and a polyethylene glycol. In some embodiments up to 5% by weight of fatty acid is added to up to 5% by weight of glycol.

Polyethylene glycol is a good binder and fatty acid a good lubricant. Together, the two components form a mixture which gives good processability in the formation of the "green" articles.

The aqueous solution may include hydroxide ions introduced by adding an hydroxide which dissociates in water. Typical examples are sodium hydroxide, potassium hydroxide, ammonium hydroxide and the like.

The hydroxide should be added in sufficient proportions to ensure stoichiometric reaction which the binder, whilst retaining low viscosity which permits effective penetration of the article.

The fluid may be stirred or otherwise agitated during the removal process. Alternatively, the article itself may be agitated while immersed thereby enhancing the penetration of fluid into the article. Suitable agitation apparatus will be known to the person skilled in the art.

Once the modification process is complete, any binder derivative remaining in the article may be removed by washing of the article in clean water. The washing process may be repeated to ensure complete removal of modified binder. Where a metal hydroxide solution has been used, the progress and effectiveness of the washing process may be monitored by measuring the conductivity of the of each wash solution; remaining metallic ions in solution will give relatively high conductivity readings.

After washing the article may be dried and then sintered to form a consolidated product.

The particles may be metallic for example niobium, aluminium, tantalum and other anodisable metals. In one embodiment the particles comprise tantalum powder. The article may be configured to be the anode of a capacitor. Such articles range in size from about 0.6 mm cubed to cylinders about 6 mm in diameter and 7 mm long.

The present invention has particular application in the production of tantalum capacitors whereby tantalum powder anodes are formed from sintered tantalum powder and then incorporated into the capacitor. In such products it is essential that all binder or binder residues are removed in order to ensure correct and reliable operation of the capacitor formed, in particular by restricting the formation of a carbonaceous deposit on the anode surface.

Following is a description by way of example only of methods of putting the present invention into effect.

Tantalum powder is mixed with a small quantity (5% by weight) of stearic acid ($CH_3.[CH_2]_{16}$—COOH) binder/lubricant. The mixture is then pressed to form a shaped article, in this example the anode component of a solid state capacitor.

The article is then immersed in 0.5% aqueous sodium hydroxide solution heated to about 80° C. for about 30 minutes to effect reaction. During this time the article is agitated to ensure complete penetration of the article by the solution, and also to ensure that unreacted solution is continually introduced into the article while reaction products dissolve into the bulk solution.

Once the reaction/dissolution process is complete, the article is removed from the solution and washed in clean water to remove any remaining stearate present in the pores of the article. The washing step may be repeated to ensure complete cleaning. After each step the conductivity of the cleaning solution can be sampled by conventional methods to give an indication of the sodium ion concentration. As the sodium ions are washed away, conductivity of the wash solution decreases until the required cleanliness is achieved.

In an alternative embodiment of the present invention the binder comprises a mixture of stearic acid and polyethylene glycol with an average molecular weight of 2000. The acid and glycol are present in weight percentages of 4% and 0.5% respectively (as a percentage of tantalum weight). The rest of the process variables are substantially identical.

The process chemicals used in the methods of the present invention are relatively low hazard, cheap and easily disposable with a low environmental impact.

Tantalum anodes produced in a method according to the present invention are very low in carbon because the carbonaceous materials are, in effect, completely removed. Furthermore, negligible quantities of oxygen are added during the binder removal process due to the low temperatures possible in the removal process of the present invention. Because of this the electrical characteristics of the finished articles are significantly improved. In particular, the reliability of the capacitors is increased and current leakage in use is reduced.

What is claimed is:

1. A method of manufacturing a solid state capacitor comprising:

(a) providing a mixture of particles of an anodisable metal and a binder, (b) pressing the mixture to form a green article, (c) removing the binder, and (d) thereafter sintering the green article to fuse the particles to form an integral porous anode body, (e) characterised in that the binder comprises a water-insoluble material and is removed before sintering by contacting the green article with an aqueous solution consisting essentially of sodium hydroxide, potassium hydroxide or ammonium hydroxide which reacts with said binder to produce a water-soluble derivative thereof whereby said water-soluble derivative is substantially dissolved in said solution.

* * * * *